United States Patent
Huber

(10) Patent No.: US 7,513,287 B2
(45) Date of Patent: Apr. 7, 2009

(54) METHOD AND DEVICE FOR COATING STRUCTURAL PARTS

(75) Inventor: Reinhard Huber, Freudenstadt-Dietersweiler (DE)

(73) Assignee: Robert Bürkle GmbH, Freudenstadt (DE)

( * ) Notice: Subject to any disclaimer, the term of this patent is extended or adjusted under 35 U.S.C. 154(b) by 837 days.

(21) Appl. No.: 10/946,595

(22) Filed: Sep. 21, 2004

(65) Prior Publication Data

US 2005/0064100 A1    Mar. 24, 2005

(30) Foreign Application Priority Data

Sep. 23, 2003    (DE) ................................ 103 44 383

(51) Int. Cl.
*B32B 37/00*    (2006.01)

(52) U.S. Cl. .................. 156/580; 414/419; 414/758

(58) Field of Classification Search .............. 414/419, 414/420, 758, 759, 764, 767, 773, 771, 405; 198/402, 403, 404; 156/580

See application file for complete search history.

(56) References Cited

U.S. PATENT DOCUMENTS

| | | | | | |
|---|---|---|---|---|---|
| 1,462,468 A | * | 7/1923 | Schaller | ...................... | 414/419 |
| 3,540,609 A | * | 11/1970 | Lefort | ......................... | 414/419 |
| 4,684,113 A | * | 8/1987 | Douglas et al. | ............... | 269/21 |

FOREIGN PATENT DOCUMENTS

| EP | 0 835 739 | 4/1998 |
|---|---|---|
| EP | 1 228 852 | 8/2002 |

* cited by examiner

*Primary Examiner*—John L Goff
(74) *Attorney, Agent, or Firm*—Volpe and Koenig, P.C.

(57) ABSTRACT

A method for coating flat structural parts (2), in particular furniture fronts, with a film (3), wherein the parts lie in a pallet (1) which is turned by about 180° in a rotator after the coating process, so that the coated parts (2) joined by a common film (3) can fall out of the pallet (1) and be separated. The essential point is that a pallet (1) which can be filled on two sides is used and that the previous turning back of the pallet after the part has been removed can be omitted.

3 Claims, 3 Drawing Sheets

METHOD AND DEVICE FOR COATING STRUCTURAL PARTS

BACKGROUND

The invention relates to a method and a device for preferably three-dimensional coating of parts, in particular furniture fronts, with a film, whereby the structural parts lie in a pallet which is turned by about 180° in a rotator after the coating process, so that the coated structural parts joined by their common film can fall out of the pallet and be separated.

The coating usually takes place in a press where the structural parts, optionally pretreated with an adhesive, are connected with the film under the effect of pressure and heat. To make it possible to convey several workpieces simultaneously to the press, coat them there and subsequently drive them out, the workpieces lie in a common pallet. They do not only have to be removed from said pallet after the coating process, but must also primarily be cut out of the common film connecting them.

To cut the coated structural parts out, the pallett drives into a rotator in which a vertically adjustable conveyor belt is located. This conveyor belt travels up to the structural parts from the top and clamps them in the pallet. This is followed by a 180° turning, so that the structural parts then lie with their film downward on the conveyor belt. The conveyor belt is then lowered, as a result of which the joined structural parts fall out of the pallet. They are then driven longitudinally or diagonally out of the rotator and cut out of the film on a cut-out table.

As soon as the charge has fallen out of the pallet, the empty pallet is turned back again and moved back into a loading station where it is again filled with the structural parts to be coated. To this end, it is necessary to either lower the pallet downward and drive it back through under the press or to convey it laterally about the press. Thus, a loading station is required on the input side of the press, a rotator on the output side and a cut-out table. As a result, the entire coating system requires a relatively great deal of space, the equipment required is also quite expensive.

SUMMARY

The object of the present invention is to provide the known coating process and the associated device in a more compact form. At the same time, the invention is to be distinguished by a cost-effective construction and efficient mode of operation.

According to the invention, this object is solved in that a pallet that can be filled from both sides is used and that, once the parts have been removed, the conventional return of the pallet is omitted.

The possibility of filling the pallet on two sides, both on its upper side and on its lower side and its resultant two-sided process usefulness in the press, not only results in decreasing the cycle time because the previously required return of the pallet is omitted. Rather, the invention also offers the possibility of omitting the previously required return transport of the pallet to the loading station and makes it possible to fill the pallet with new parts directly in the rotator itself or in a loading table situated beside it. Moreover, one only needs to work with a single pallet, whereas previously several pallets were circulated in most cases. As a result, the operational cycle is significantly streamlined and, at the same time, the equipment expenditure and the space required herefor reduced.

The isolation of the coated parts after turning can take place outside of the rotator. However, it is especially advantageous if the separation takes place directly in the rotator itself, either after the pallet is moved into a position that does not hinder the cutting out or after it has been filled again and is moved into the press.

As before, after the turning, the coated parts can fall onto a lowerable base plate. According to the invention, however, this base plate remains in the rotator and only conveys the parts into an operational level that is advantageous for cutting out the parts after the empty pallet has been moved out of this area.

In a further embodiment of the invention, it is proposed that an empty pallet be refilled in the rotator itself. This can take place immediately after the turning, because the coated products of the prior charge are thereby not in the way. As a result, the previously required additional conveying devices and the related expenditure of time are omitted. However, it is also within the scope of the invention to refill an empty pallet in a lateral loading station.

Advantageously, the aforementioned base plate is arranged in the rotator so as to be vertically adjustable in such a way that it is also used to clamp the parts coming from the coating press prior to and during the turning.

The device for carrying out the method according to the invention is characterized in that a pallet is used which can be filled and sealed both on the upper side and also on the underside. On the basis of the previous positioning of the seal on the upper side, it is recommended that the pallet be provided with an additional, similar seal on the underside and to design it essentially symmetrical on the bottom and on the top so that both sides can be filled equally well.

Advantageously, the aforementioned base plate is combined with a conveyor which allows the coated products to be moved out toward the front or side in a synchronized manner, so that they can be cut out from the edge and removed by the attendant.

Therefore, the structural design of the pallet is more or less characterized in that its frame projects not only upward, as previously, but also downward in a similar manner. The result of this is that the coating press must have a lower press table adapted to it which is arranged in steps downward in the area of the pallet frame so that it can support the pallet floor carrying the parts from the bottom.

BRIEF DESCRIPTION OF THE DRAWINGS

Further features and advantages of the invention can be found in the following description of an embodiment of the invention with reference to the drawings and in the drawings themselves, showing FIGS. 1 to 6 each show a cross sectional view through the rotator in a schematic representation in chronologically successive procedural steps.

DETAILED DESCRIPTION OF THE PREFERRED EMBODIMENTS

Figure 1:
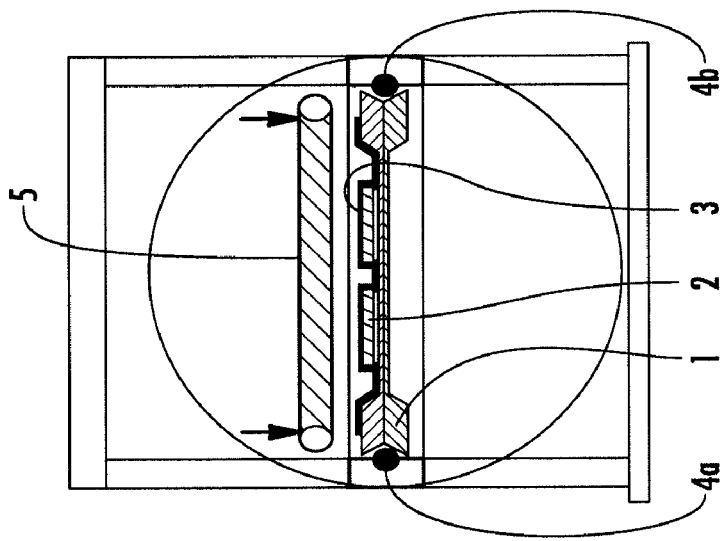

A pallet 1 can be seen in FIG. 1 which is filled with several coated parts 2 on its upper side. The parts 2 lie on the pallet separated by spacers with a smaller cross section, so that the coating film 3 adheres not only to the upper side but also to the lateral peripheral surfaces up to the bottom edge of the parts.

Alternatively to the aforementioned spacers, an automatic base plate system which is built into the coating press can be used.

Figure 3:
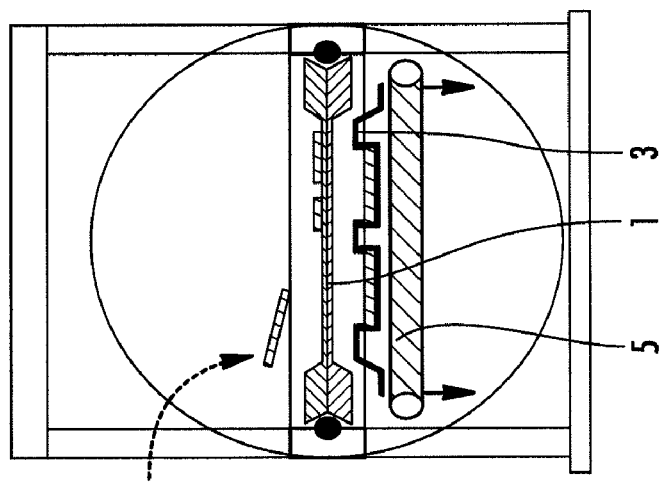

On the side, the pallet 1 is mounted on guide rails 4a and 4b so as to be horizontally movable, so that it can be driven into and out of the rotator. The guide rails 4a and 4b are pivoted about a common, horizontal central axis in the rotator, so that the pallet 1 can be turned by 180° from the position shown in FIG. 1 into the position of FIG. 3.

In addition, a plate 5 is arranged parallel to the pallet 1 in the rotator. This plate 5 is mounted in the rotator so as to be vertically adjustable and can at the same time follow the aforementioned rotational movement of the pallet 1.

The procedural steps are as follows:

Coming from the press, the pallet 1 with the freshly coated parts 2 is moved into the rotator. The plate 5 is thereby spaced in a position above the pallet 1. This state is shown in FIG. 1.

Figure 2:
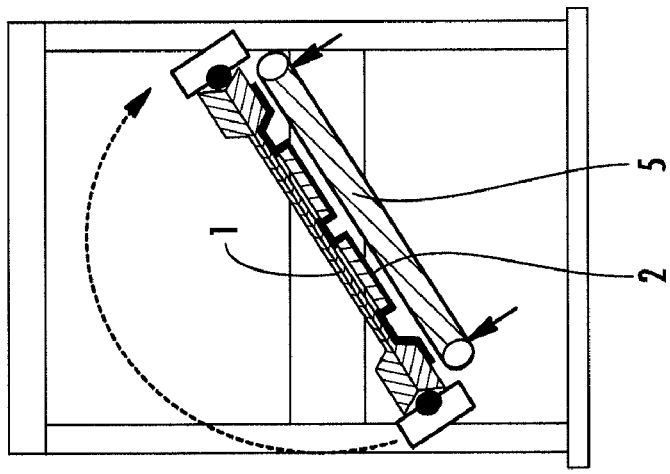

The plate 5 then travels downward until it adjoins the upper side of the pallet 1 and/or its coated parts 2. This is followed by the turning action, as is shown in FIG. 2, after an angle of rotation of about 150°. Toward the end of this turning process, the workpieces 2 with their common film 3 fall out of the pallet 1 and then lie on the plate 5 which now no longer functions as a cover but as a base plate.

Figure 4:
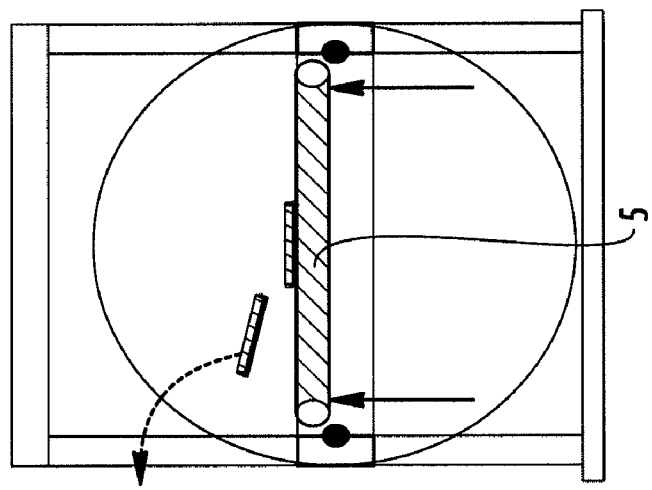

When the turning process has ended, then the plate 5 is lowered with the parts 2 carried on it and the pallet 1 which is now horizontal again is refilled with new, glued parts 2 and film 3 on its upper side. This state can be seen in FIGS. 3 and 4.

Figure 5:
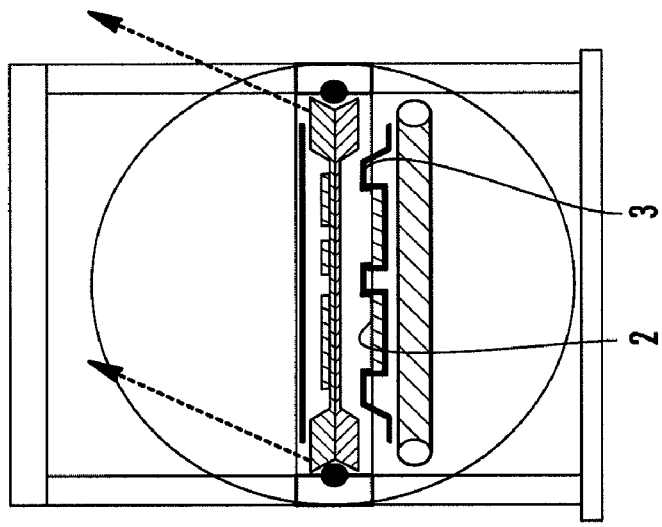
Figure 6:
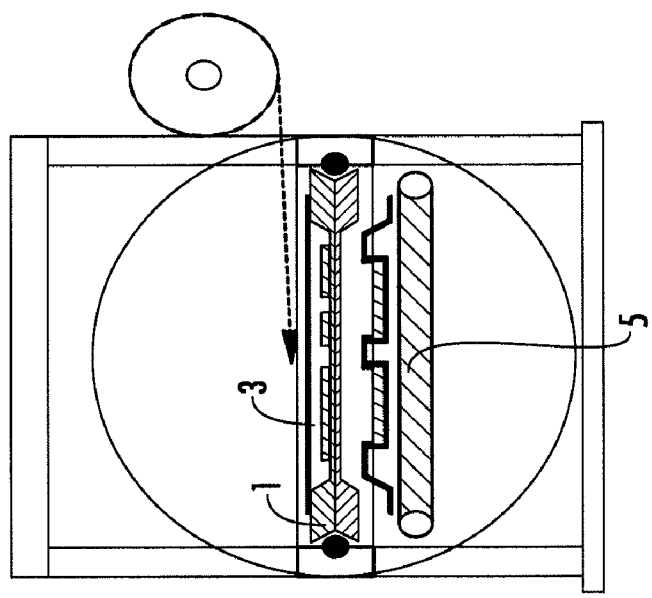

If the pallet has been completely filled, then it travels back into the coating press (not shown) and the plate 5 with the coated parts 2 travels upward into the empty space of the rotator, see FIGS. 5 and 6. The parts which are glued with the film 3 on their lower side and the lateral edges can now be cut out of the film and removed without difficulty. At the same time, the coating of the next charge takes place in the press.

The cutting out of the coated parts begins on the edge, on the left edge of the plate 5 in FIG. 6. It can be seen that the plate 5 is equipped with a conveyor belt 6 for this purpose which moves the products in a synchronized manner toward the left, so that they can be easily cut out on the edge of the plate 5 and separated. If the product row on the peripheral edge has been removed, then the attendant turns the conveyor belt 6 on again in order to move the next product row to the edge.

Figure 7:
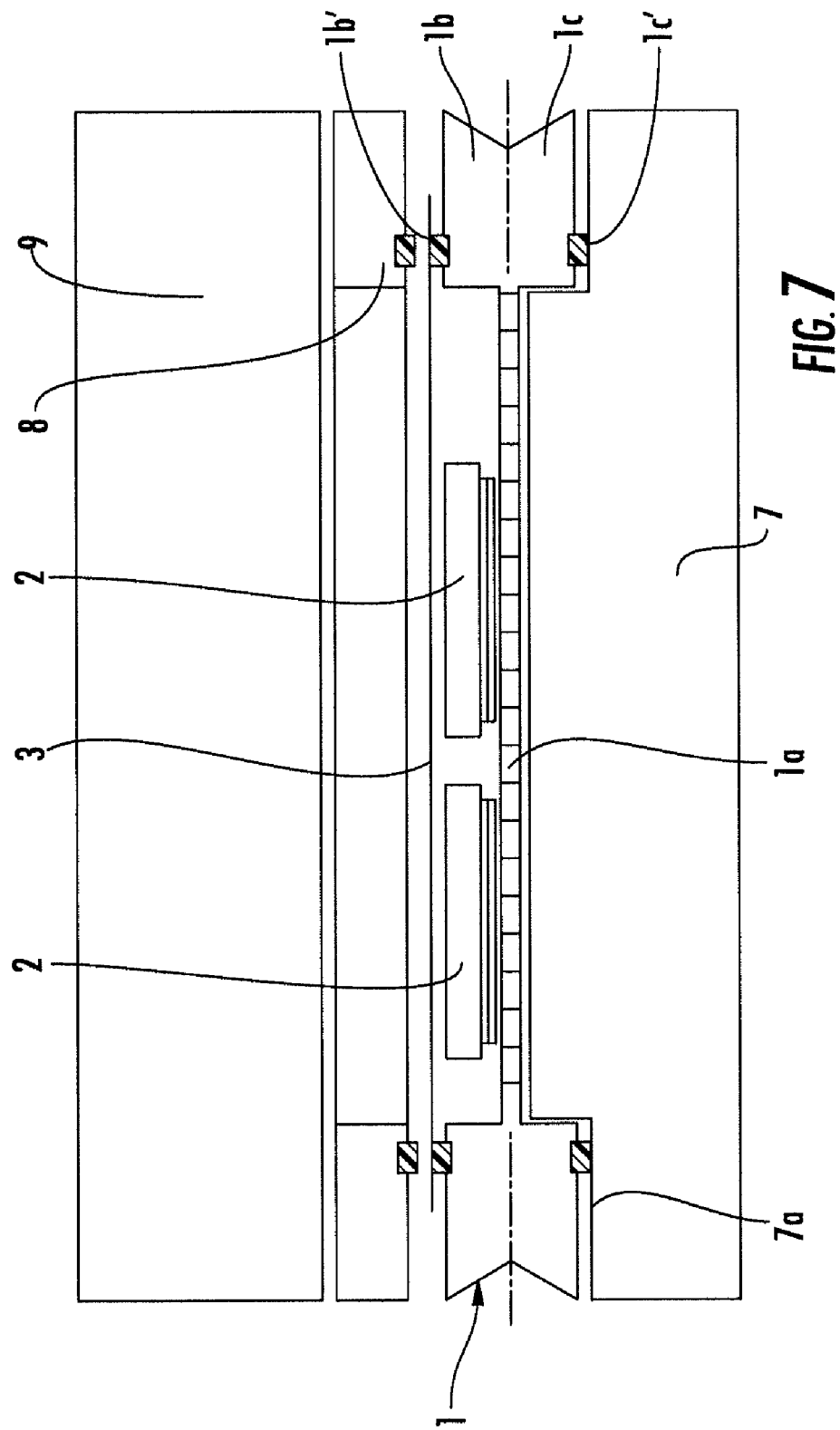
FIG. 7 IS a partial cross sectional view through the process chamber of the coating press.

FIG. 7 shows the pallet according to the invention in the process chamber of the coating press. As before, it consists of a perforated pallet floor 1a and an encircling upper frame 1b, however, according to the invention, it is provided with a similar lower frame 1c. Both frames have a peripherally extending seal 1b' and 1c', respectively, on their side facing away from the pallet floor 1a. As a result, the pallet has surface fields which are functional on the top and on the bottom and is process useful on both sides.

Moreover, it can be seen in FIG. 7 that the lower press table 7 carrying the pallet has a contour adapted to the cross section of the pallet, namely a peripheral gradation 7a for receiving the lower pallet frame 1c. On the other hand, the central part of the lower press table 7 projects upward and supports the pallet floor 1a, so that it does not significantly sag during the coating process, in particular during the high-pressure action on the film 3.

In the embodiment, the parts 2 to be coated lie on spacers so that they can be optimally coated with the film 3 not only on the upper side but also on their vertical lateral surfaces. However, it is of course also within the scope of the invention to provide a PIN system in the pallet or in the lower press table instead of said spacers to lift the parts 2 from the pallet floor 1a.

Finally, FIG. 7 also shows the conventional upper sealing frame 8 which presses the film 3 against the upper pallet frame 1b and seals it as well as the hot plate 9 which is moved closely adjacent to the upper side of the sealing frame 8. In this respect, the process chamber corresponds to the conventional construction.

In summary, therefore, the invention is distinguished by a considerably more cost efficient and more streamlined operation due to the fact that the pallet can be used on two sides.

The invention claimed is:

1. A device for coating parts (2), comprising a pallet (1) which is pivotally mounted in a rotator, the pallet including an upper frame and a lower frame that extend outwardly in opposite directions from a pallet floor to define upper and lower pallet sides, and peripherally extending seals extend around the upper frame and the lower frame, the seals defining sealing planes on each of the sides, the pallet is pivotable so that either the upper frame or the lower frame faces upwardly toward a sealing frame of the device, which is engageable and seals against a film and the upwardly facing one of the upper frame or the lower frame in a coating position, wherein the parts on the upper side the pallet, after a coating process, lie on the pallet (1) so that the coated parts (2) joined by the film (3) can fall from the pallet (1) upon the upper side being rotated to an unloading position, and the pallet (1) can be filled on the lower side that has been rotated to a loading position with additional ones of the parts (2) to be coated.

2. The device according to claim 1, wherein the upper and lower sides of the pallet (1) are constructed essentially symmetrical.

3. The device according to claim 1, further comprising a lower press table (7) with a graduated profile for receiving a downwardly facing one of the upper frame or the lower frames so that the pallet floor is supported by the lower press table in a coating position.

* * * * *